United States Patent [19]

Angelo et al.

[11] Patent Number: 5,622,371

[45] Date of Patent: Apr. 22, 1997

[54] STUFFING BOX WITH IMPROVED PACKING RINGS AND METHOD

[76] Inventors: Lawrence F. Angelo, 27281 Paula La., Conroe, Tex. 77385; J. William Heathcott, 3817 Pecan Valley Dr., Missouri City, Tex. 77459; Stephen L. Witte, Sr., 26 Bending Branch Pl., The Woodlands, Tex. 77381

[21] Appl. No.: 584,114

[22] Filed: Jan. 11, 1996

[51] Int. Cl.$^6$ ..................................................... F16J 15/24
[52] U.S. Cl. .............................. 277/1; 277/105; 277/110; 277/227; 277/117
[58] Field of Search ..................................... 277/102, 105, 277/110, 116.2, 116.8, 117, 121, 123, 125, 199, 227, 1

[56] References Cited

U.S. PATENT DOCUMENTS

| | | |
|---|---|---|
| 756,880 | 4/1904 | McIntire . |
| 882,103 | 3/1908 | Edgecumbe . |
| 1,184,212 | 5/1916 | Reuschline . |
| 2,081,040 | 5/1937 | King . |
| 2,553,750 | 5/1951 | Cole ........................................ 277/123 |
| 2,845,286 | 7/1958 | Case et al. . |
| 3,002,776 | 10/1961 | Tschappat ............................. 277/105 |
| 3,068,942 | 12/1962 | Brown .................................. 277/116.2 |
| 3,168,320 | 2/1965 | Sneed . |
| 3,188,048 | 6/1965 | Sutherland ............................. 277/102 |
| 3,284,086 | 11/1966 | Primrose ................................ 277/102 |
| 3,284,088 | 11/1966 | Pippert . |
| 3,331,609 | 7/1967 | Moran .................................... 277/110 |
| 3,393,917 | 7/1968 | Kendall et al. . |
| 3,918,726 | 11/1975 | Kramer . |
| 4,040,636 | 8/1977 | Albertson et al. . |
| 4,268,045 | 5/1981 | Traub . |
| 4,327,923 | 5/1982 | Chesterton et al. . |
| 4,451,047 | 5/1984 | Herd et al. . |
| 4,480,842 | 11/1984 | Mahyera et al. . |
| 4,560,176 | 12/1985 | Hoff . |
| 4,570,944 | 2/1986 | Traub .................................... 277/121 |
| 4,991,857 | 2/1991 | Pippert . |
| 5,022,660 | 6/1991 | Dunford et al. ......................... 277/9 |

FOREIGN PATENT DOCUMENTS

| | | |
|---|---|---|
| 307207 | 3/1929 | United Kingdom . |
| 446869 | 5/1936 | United Kingdom . |

OTHER PUBLICATIONS

PC Pumping Systems: Design, Operation and Performance Optimization, 1994, p. 162, ©1994.
Huber–Herceules General Product Catalog, HHG–94, pp. 1, 2 and 17–26 (date unavailable).

*Primary Examiner*—Daniel G. DePumpo
*Attorney, Agent, or Firm*—Browning Bushman

[57] ABSTRACT

A stuffing box 10, 60 designed for sealing engagement with a rod member R includes a plurality of stacked packing rings 32, 110, 150, 210, and a gland member 42, 64 axially moveable relative to the stuffing box body 12, 62 for varying the compressive force on the packing rings. Each packing ring comprises an annular rubber carrier 34, 112, 152, 212 having tapered upper and lower surfaces, and an annular plastic dynamic seal 36, 114, 154, 214 for sealing engagement with the rod member. Gland member 42, 64 exerts an axially compressive force on the radially exterior portion of each angularly wedged packing ring and thereby generates a radial inwardly directed biasing force on each plastic dynamic seal through the rubber carrier for sealing engagement of the dynamic seal with the rod member. Each packing ring includes an annular recess in at least one of the tapered upper and lower surfaces for thermal expansion of the rubber carrier, for flexing of the packing ring, and for increasing radial forces on the dynamic seal.

62 Claims, 2 Drawing Sheets

STUFFING BOX WITH IMPROVED PACKING RINGS AND METHOD

FIELD OF THE INVENTION

The present invention relates to a stuffing box designed to seal with a rod member moveable relative to and passing through the stuffing box. More particularly, this invention relates to a stuffing box suitable for oilfield operations to seal with a pump rod extending to a downhole pump, and to improved packing rings for use in a stuffing box.

BACKGROUND OF THE INVENTION

Stuffing boxes are used in various applications for sealing with a rod-like member which passes through the stuffing box and either reciprocates or rotates relative to the stuffing box. The stuffing box seals with the rod member to retain fluid pressure, which is generally below the stuffing box, thereby allowing the rod member to extend upward through a sealed chamber, which is typically fluid pressurized. A plurality of axially stacked packing rings or packing glands seal between the body of the stuffing box and the rod member. The packing rings are axially compressed or loaded by adjusting a gland member moveable relative to the stuffing box body, thereby exerting a compressive force on the packing rings to result in enhanced sealing. If the stuffing box leaks, the gland member is tightened to increase the loading on the packing rings, thereby resealing the packing rings with the rod member. Packing rings or packing glands of the stuffing box are thus distinguishable from conventional seals, which generally are not provided in a stacked arrangement, are not axially compressed by mechanical forces, and cannot be intermittently loaded to vary sealing effectiveness.

Stuffing boxes for oilfield operations typically are intended for sealing with a reciprocating or rotating rod string (or more particularly with a polished rod of a rod string) which in turn drives a downhole pump. In addition to oilfield operations, stuffing boxes are widely used to seal with rotating and/or reciprocating valve stems for various types of valves, and to seal with rods or pistons of pumps and other equipment which generate or handle pressurized fluid. Stuffing boxes for oilfield operations frequently present conditions which are, however, not typically encountered in other applications. Oilfield operations frequently are in remote locations, and accordingly stuffing boxes for sealing with sucker rods may be infrequently and irregularly serviced. Reciprocating sucker rods often become misaligned over a period of time with respect to the stuffing box, so that significant side loading forces are exerted on the packing rings by the reciprocating rod string. The downhole fluid sealed by the packing rings may contain a high level of contaminates which rapidly deteriorate the packing rings, including sand particles and other solids, hydrogen sulfide, or carbon dioxide. Oilfield pumps may also "run dry" during pumped-off conditions, or may produce fluids with high water content, and during these times the packing rings normally lubricated by the recovered downhole hydrocarbons are not lubricated. In applications where recovered hydrocarbons contain a high percent of steam or high temperature water which leaks past the stuffing box, a scale buildup on the sucker rod resulting from contaminants in the steam or water may quickly damage the packing rings.

The life of oilfield stuffing boxes and particularly the packing rings for oilfield stuffing boxes is therefore relatively low. A significant amount of fluid escapes from oilfield stuffing boxes with worn-out packing rings, thereby creating environmental concerns. A good deal of time and expense are associated with servicing and repairing oilfield stuffing boxes. The need has long existed for a more reliable oilfield stuffing box in which the packing rings can reliably seal with a sucker rod over an extended period of time.

U.S. Pat. Nos. 2,845,286, 3,168,320, 3,284,088 and 4,991,857 each disclose oilfield stuffing boxes for sealing with polished rods of a rod string. British Patent Nos. 307,207 and 446,869 each disclose packing rings having a generally rectangular cross-sectional configuration. U.S. Pat. No. 4,327,923 discloses a packing which utilizes rings having a triangular cross-sectional configuration to achieve a wedging action and force the surfaces of the rings into sealing engagement with both the exterior cylindrical surface of the stuffing box body and the shaft. U.S. Pat. No. 4,451,047 discloses a stuffing box having various rings formed of graphite, tetrafluoroethylene (TFE) polymers, and metal. Upper and lower surfaces of the rings are inclined and project radially inward and axially upward toward the packing retainer or gland cap.

U.S. Pat. No. 4,560,176 discloses an improved stuffing box with inverted packing rings which have tapered upper and lower surfaces projecting radially inward and downward, away from the gland cap. U.S. Pat. No. 4,480,842 discloses a stuffing box which is primarily designed for receiving a rotatable shaft or pipe. U.S. Pat. Nos.a 756,880, 882,103 and 1,184,212 each disclose packing rings for a stuffing box wherein the packing rings include low friction elements for sealing engagement with the rod passing through the stuffing box.

U.S. Pat. Nos. 2,081,040 and 4,268,045 disclose seals configured so that the seal material may expand into voids created by the seal configuration, thereby minimizing excessive generated heat and high seal wear. U.S. Pat. Nos. 3,393,917, 3,918,726 and 4,040,636 each disclose seals formed from a combination of rubber and plastic sealing elements.

None of the above patents provide a stuffing box which reliably seals with a rod member over an extended period of time, particularly when stuffing box packing rings are subjected to fluid which contains abrasives or chemical components deleterious to conventional sealing materials. The disadvantages of the prior art are overcome by the present invention, and an improved stuffing box and packing rings for a stuffing box are hereinafter provided for reliably providing a fluid tight seal around a rod member, and particularly around a polished rod used for oilfield recovery operations.

SUMMARY OF THE INVENTION

A stuffing box for sealing engagement with a rod member includes a body having a cylindrical interior surface defining a stuffing box axis, a plurality of stacked and axially spaced packing rings, and a gland member or gland cap moveable relative to the stuffing box body for adjusting the compressive force on the plurality of packing rings. In a preferred application, the stuffing box is adapted for sealing engagement with a polished rod of a sucker rod string powering a downhole pump, and accordingly the gland member is positioned axially above the stuffing box body. Each of the packing rings includes an annular rubber carrier and an annular thermoplastic dynamic seal supported on and in static sealing engagement with the carrier. Each rubber carrier includes tapered upper and lower surfaces, and a radially outer surface for static sealing engagement with the cylindrical interior surface of the stuffing box body. Each annular dynamic seal includes a radially interior surface for dynamic sealing engagement with the rod member. The gland member has a packing ring engaging surface for exerting axially compressive force on a radially outward portion of the plurality of packing rings and thereby generating a radial inwardly directed biasing force on the thermoplastic dynamic seal through the rubber carrier for enhanced sealing engagement of the dynamic seal with the rod member.

The tapered upper surface and the tapered lower surface of each packing ring are preferably inclined at an angle of from 5° to 20° with respect to the central stuffing box axis, so that the axial force exerted by the gland member on the upper packing ring results in a substantially inward directed force on each thermoplastic dynamic seal as a result of each packing ring being wedged between the stuffing box body and the rod member. The stuffing box body preferably includes a packing ring support surface axially opposite the gland member for engagement with a radially inward portion of the lowermost packing ring. An annular void between the tapered surface of the lowermost packing ring and the support surface is provided for receiving the lowermost packing ring as the packing rings are periodically compressed within the stuffing box body, thereby decreasing the taper on the upper and lower surfaces of the packing rings. A bushing may be provided on the packing ring support surface to prevent extrusion of the lowermost packing ring, and a similar bushing moveable relative to the gland member prevents extrusion of the uppermost packing ring.

Each of the plurality of packing rings according to the present invention comprises an annular rubber carrier and a thermoplastic dynamic seal supported on the carrier. The tapered upper surface and the tapered lower surface on each rubber carrier preferably have a frustoconical configuration with an apex axially projecting away from the gland member. The rubber carrier preferably also includes a radially inward lower annular surface and a radially inward upper annular surface below and above the thermoplastic dynamic seal, respectively, for dynamic engagement with the rod member. These rubber sealing surfaces are particularly designed to reduce abrasives and other solid contaminates from engaging the thermoplastic dynamic seals of the stacked packing rings. The rubber carrier may be fabricated from a group consisting of styrene-butadiene, nitro-butadiene and hexafluoropropylene-vinylidene fluoride copolymers. The dynamic seal may be formed from a group consisting of tetrafluoroethylene (TFE), ultra-high molecular weight (UHMW) polyethylene, acetal, polyimide, polyamide, a fiber re-enforced thermoplastic, and a formed wire mesh and fabric composition may also be supported on the rubber carrier for cleaning the rod member.

The rubber carrier preferably includes an annular upper recess and an annular lower recess in the respective tapered upper and lower surfaces each spaced between the radially outer cylindrical surface of the rubber carrier and the thermoplastic dynamic seal to minimize radial loading of the radially inward annular surfaces of the rubber carrier on the rod member relative to the loading of the thermoplastic dynamic seal on the rod member. At least a portion of these annular recesses are preferably concentric or axially aligned to facilitate bending of the rubber carrier, thereby maximizing the sealing effectiveness of the packing rings. The volume of these annular recesses is at least 5% and preferably at least 8% of the volume of the rubber carrier to accommodate thermal expansion of the rubber carrier. In cross-section, the rubber carrier thus has a substantially H-shaped configuration, with the axial depth of the annular recesses and the axial length of the radially interior surface of the thermoplastic dynamic seal being at least 70% of the axial length of the radially outer surface of the rubber carrier.

According to the method of the present invention, a plurality of packing rings are each stacked within a cylindrical interior chamber in a stuffing box body. Each packing ring is configured such that, when first installed within the stuffing box body, the tapered upper surface and the tapered lower surface on each rubber carrier are inclined at an angle of from 5° to 20° with respect to a plane perpendicular to the central stuffing box axis. Upper and lower annular recesses in the rubber carrier allow the radially inner and radially outer supports or legs of the rubber carriers to engage, with the annular recesses forming voids for minimizing radial loading of the rubber carrier on the rod member, allowing flexing of the rubber carrier to increase sealing effectiveness, and allowing for thermal expansion of the rubber carrier to minimize excessive generated heat and wear of the packing rings. A gland member is provided moveable relative to the stuffing box body and exerts an axially compressive force on a radially exterior portion of each of the plurality of packing rings by engagement with the adjacent packing ring, which then transmits the axially compressive force through the outer legs of the rubber carrier to an adjoining packing ting. This axially compressive force wedges each packing ring between the stuffing box body and the rod member, thereby generating a radial inwardly directed biasing force on each thermoplastic dynamic seal for improved sealing engagement with the rod member. As the packing rings wear, the gland member is intermittently lowered to increase the compressive force on the packing rings, thereby also decreasing the angle of the mating upper and lower tapered surfaces of the packing rings and increasing the inwardly directed biasing force. A plurality of circumferentially spaced holes may be provided each extending through the upper surface of each packing ring. Each packing ring may be easily removed from the stuffing box by threading a conventional bolt into each hole, and lifting the circumferentially spaced bolts to exert an upward force on the packing ring.

It is an object of the present invention to increase the useful life of a stuffing box by providing longer lasting packing rings which reliably seal with a rod member. It is a related object of the invention to provide improved packing rings for a stuffing box which are capable of reliably sealing with a rod member, particularly when the packing seals are subjected to fluids with high solids content or fluids otherwise deleterious to the life of conventional seal materials. An annular void is provided axially opposite the gland member, so that the gland member may be periodically moved to compress each packing ring while partially filling the annular void.

It is a related object of the present invention to provide improved packing rings for a stuffing box wherein each packing ring is formed from a rubber carrier and a relatively low friction annular dynamic seal supported on each carrier for sealing engagement with the rod member. By reducing the coefficient of friction between the primary seal on the packing ring and the rod member, the heat generated by movement of the rod member with respect to the stuffing box is reduced, thereby prolonging the life of the packing rings. The material for the dynamic seal may be selected for low friction and high durability, and preferably is a plastic material capable of chemically withstanding the anticipated fluids to which the seal will be subjected.

It is a further object of the invention to provide improved packing rings for a stuffing box which have tapered upper and lower surfaces for mating engagement with another packing ring such that each packing ring may be wedged between the stuffing box body and the rod member to increase sealing effectiveness. The tapered surfaces on each packing ring are preferably angled away from the gland member, and the gland member exerts an axially compressive force on an outer portion of each packing ring for reliable sealing engagement of the rubber carrier with the stuffing box body. This wedging action produces a significant radial inwardly directed force which is transmitted through the rubber carrier to each of the thermoplastic dynamic seals for reliable sealing engagement of the thermoplastic dynamic seals with the rod member.

It is a particular feature of the present invention that the stuffing box may be used for reliably sealing with a polished rod of a rod string powering a downhole pump. The stuffing box has an extended life even when packing rings are subject to high temperature downhole fluids, fluids with abrasives or other high solids content, or fluids with carbon dioxide, hydrogen sulfide, or other components generally deleterious to seal life. At least a portion of the rubber carrier preferably engages the rod member to minimize abrasives in the fluid which contact the thermoplastic dynamic seals. A related feature of the invention is that the packing rings reliably seal with the polished rod of a rod string during a pump-off condition wherein lubricating fluids are not supplied to the packing rings.

Another feature of the invention is that the rubber carrier of each packing ring is provided with at least one annular groove spaced radially between an outer surface of the packing ring and the dynamic seal. The annular groove accommodates thermal expansion of the rubber carrier, allows cross-sectional flexing of the rubber carrier, and directs the radially inward biasing force primarily on the dynamic seal to minimize the radial inward loading force on the inner surfaces of the rubber carrier, which preferably also sealingly engage the rod member.

Still another feature of the invention is that the stuffing box according to the present invention may be used for reliable sealing engagement with either a reciprocating rod string and with rotating rod string each powering a downhole pump. The rod string may become misaligned with respect to the central axis of the stuffing box body, and the rubber carrier allows the packing rings to nevertheless provide reliable sealing engagement between the stuffing box body and the rod member. The packing rings are thus better able to withstand substantial side loading forces exerted on the packing rings by the rod member without significantly decreasing the life of the thermoplastic seals.

Each dynamic seal is fabricated from a low coefficient friction material such as a thermoplastic material, for reducing generated heat, thereby prolonging the life of both the rubber carrier and the dynamic seal. The annular dynamic seal may be provided as an insert for fitting within a radially inward annular groove in the rubber carrier, so that the dynamic seal may be easily replaced on an existing rubber carrier. Easy replaceability of the packing rings within the stuffing box body and easy replacement of a dynamic seal on each rubber carrier allows the packing rings to be easily customized for particular applications by altering the selected material for both the rubber carrier and the dynamic seal.

A significant advantage of the present invention is that the packing rings may be reliably utilized on existing stuffing boxes. A further advantage of the invention is that the required inventory of packing rings may be reduced by allowing each packing ring to be easily customized with a selected material for both the rubber carrier and the dynamic seal. A further advantage of the present invention is that each packing ring may be provided with circumferentially spaced holes in an upper surface for facilitating removal of each packing ring from the stuffing box body utilizing a threaded removal tool.

These and further objects, features and advantages of the present invention will become apparent from the following detailed description, wherein reference is made to the figures in the accompanying drawings.

DETAILED DESCRIPTION OF THE PREFERRED EMBODIMENTS

Figures 1, 2:
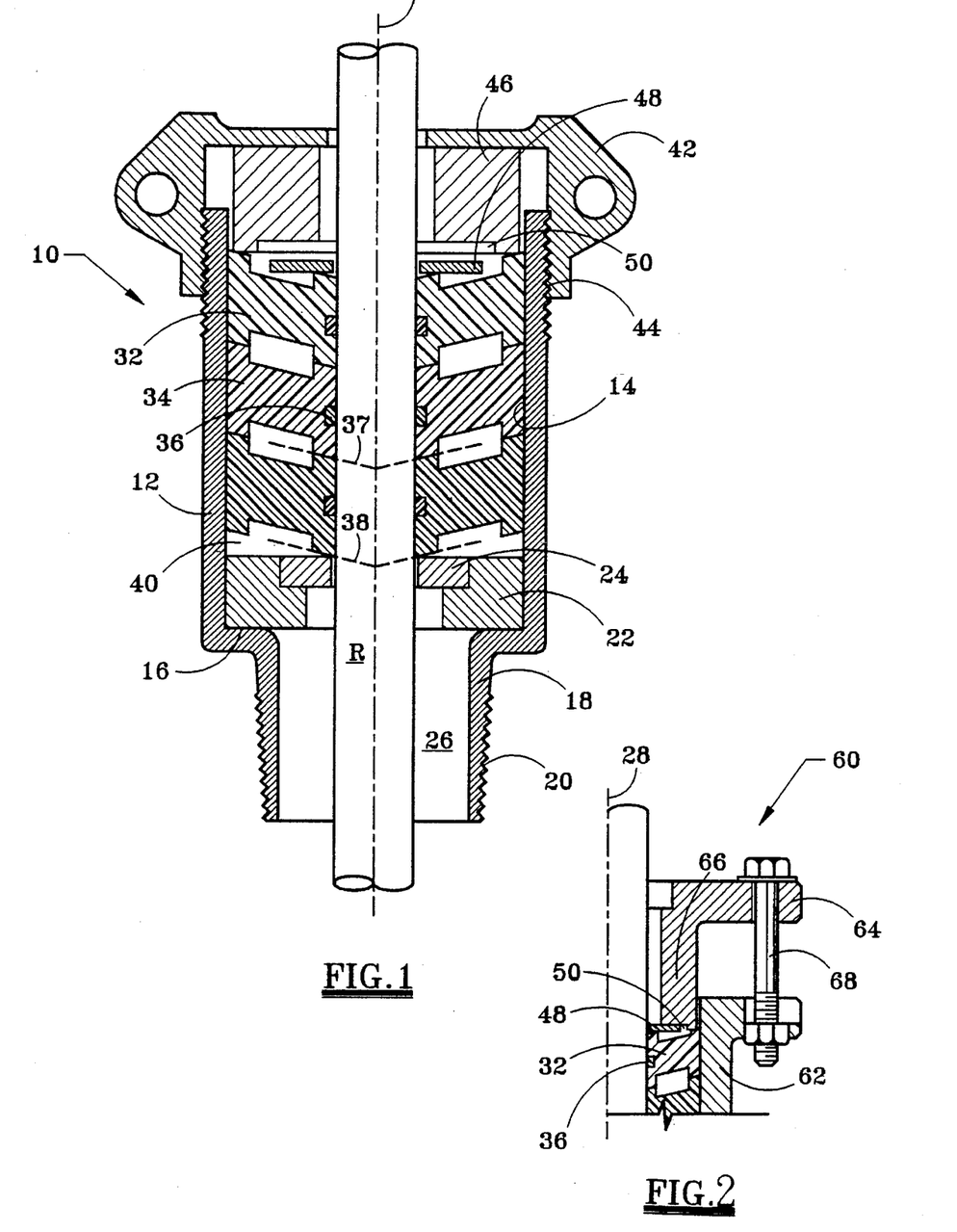
FIG. 1 is an elevational view, partially in section, of a suitable oilfield stuffing box according to the present invention.
FIG. 2 is an elevational view of an upper portion of an alternate embodiment of a stuffing box, with axial adjustment between the gland member and the stuffing box body being provided by a plurality of circumferentially spaced bolts.

FIG. 1 depicts one embodiment of a stuffing box 10 according to the present invention. The stuffing box 10 is designed for sealing engagement with a polished rod R of a rod string which passes through and moves relative to the stuffing box for driving a downhole pump. For the embodiment as shown in FIG. 1, the rod R reciprocates relative to the stuffing box, although an alternative embodiment of the stuffing box may utilize a rotating polished rod of a string which drives a progressive cavity downhole pump. The oilfield stuffing box 10 is thus designed for sealing with a solid polished rod to retain fluids in a well and to prevent their escape into the environment. In a broader sense, the stuffing box 10 of the present invention is designed for sealing with any rod member which has a cylindrical exterior surface. The rod member may be either solid or tubular, and may either rotate and/or reciprocate relative to the stuffing box.

Stuffing box 10 comprises a body 12 having an interior surface 14 defining a cylindrical cavity therein for receiving a plurality of stacked packing glands or packing rings 32. Cylindrical interior surface 14 defines a stuffing box central axis 28, which for the depicted embodiment will be understood to be a vertical axis. Ideally each packing ring has a similar configuration so that the packing rings may be stacked in any order, although optionally the uppermost or the lowermost packing ring could have a modified configuration. Three stacked packing rings 32 are shown in FIG. 1, although any number of packing rings may be used depending on the application and the configuration of the body 12.

For purposes of clarity and simplicity, it should be understood that when the terms "downward", "below", "upward" or "above" are utilized herein, these terms are relative terms to be construed in light of the embodiment as shown in FIG. 1 wherein the stuffing box body has a vertical axis 28, and the rod member passing through the stuffing box similarly has a vertical axis. In other embodiments, the stuffing box may be oriented differently, so that the rod member may be horizontal or may be inclined.

The body 12 has a lowermost packing support surface 16 which is a planar horizontal surface perpendicular to the central axis 28. A neck 18 extends downwardly from the body 12 and includes external threads 28 for mating connection to a wellhead (not shown) at the surface of a well bore. In a typical application, the well bore is employed to recover oil or other hydrocarbons from a well. Accordingly, the cylindrical interior bore 26 which loosely receives a rod R is exposed to well fluids, which may include hydrocarbons, water, steam, sand or other solid particles, carbon dioxide and/or hydrogen sulfide. Packing ring seat 22 is supported on the planar surface 16, and preferably includes a replaceable bushing 24 which has an interior diameter only slightly greater than the diameter of the rod R.

An upper gland cap or gland member 42 is threadably connected to the stuffing box body 12 by threads 44. The lower end of gland ring 46 engages the radially outward portion of the uppermost packing ring 32 to provide a desired axial loading on the packing rings. The packing rings as shown in FIG. 1 are substantially in their initial installed position. After a breaking in period, the packing rings need to be loaded to maintain sealing integrity with both the body 12 and the rod R. The sealing effectiveness of the packing rings may be enhanced by rotating the gland member 42 on the body 12 to lower the ring 46, thereby axially loading each of the packing rings 32. The radially outward portion, and preferably the radially outward 20 to 25% of the packing rings is loaded, while the radially inward portion of the packing rings is either out of engagement with the gland member or, if engaged by the gland member, is not highly loaded. An upper bushing 48 is provided in cavity 50 within the ring 46, and prevents extrusion of the uppermost packing ring between the rod R and the ring 46. Bushing 48 may thus move radially within cavity 50 within gland ring 46 if the rod R becomes misaligned relative to the axis 28 of the stuffing box. Although not shown in FIG. 1, it should be understood that an oversized cavity may be provided in the lower seat 22, thereby allowing the lower bushing 24 to similarly move radially relative to the lower seat 22 during misalignment of the rod R.

Referring to FIG. 2, an alternate embodiment of an oilfield stuffing box 60 is disclosed with a stuffing box body 62 including an upper flange having a plurality of circumferentially spaced holes therein. The gland member 64 is provided with a lower portion 66 integrally connected to its upper portion, such that the lower portion 66 engages the uppermost packing ring 32. The circumferentially spaced holes in the body 62 and in the gland member 64 are each aligned for receiving a conventional adjustable securing member, such as bolt 68. The axial loading of the packing rings may be effected by tightening the plurality of circumferentially spaced bolts 68, thereby lowering the gland member 64 to load the packing rings as previously described. In the FIG. 2 embodiment, the gland member 64 has been tightened so that the lower end of portion 66 axially loads the plurality of packing rings 32. The bushing 48 is axially sandwiched between portion 66 and the uppermost packing ring 32, but may move radially within oversized cavity 50.

It is to be understood that various types of gland members or gland caps may be utilized according to the present invention, and various techniques may be employed to axially move or lower the gland cap to intermittently load the packing rings and increase sealing effectiveness. The gland cap or gland member may also be provided with an oil reservoir so that clean oil may be used to lubricate the polished rod R as it reciprocates through the stuffing box. Also, the gland member may be provided at the lower end of the stuffing box body if the fluid to be sealed by the stuffing box is provided above the stuffing box body.

Figure 3:
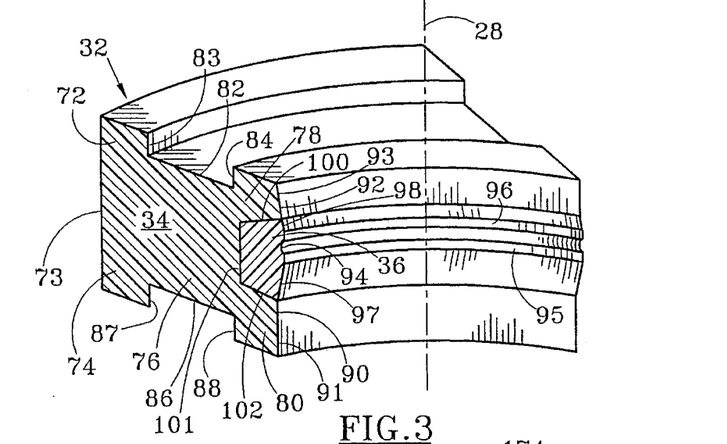
FIG. 3 is a detailed pictorial view of one of the packing rings generally shown in FIG. 1.

Referring to FIGS. 1 and 3, a suitable packing ring 32 according to the present invention includes a rubber carrier ring 34 and a dynamic sealing ring 36 supported on and in sealing engagement with the rubber carrier 34. The rubber carrier 34 provides a normally static seal with the stuffing box body, while the seal 36 provides the primary dynamic seal with the rod member R and is in static sealing relationship with the rubber carrier. In a preferred embodiment, a radially inner groove in the rubber carrier 34 is provided for receiving the dynamic sealing ring 36, and the sealing ring 36 accordingly may be easily removed and replaced from the rubber carrier, as discussed hereafter. In other embodiments, the dynamic sealing ring 36 may be bonded or otherwise secured to the rubber carrier 34. It is to be understood that each rubber carrier 34 and each thermoplastic dynamic sealing ring 36 may include a slit along its periphery to allow each packing ring to be split apart and placed about and subsequently removed off the rod R. For many applications, it is desirable to orient each packing ring when disposed within the body 12 such that the slits of the packing rings are not circumferentially aligned, since alignment of each of the slits of stacked packing rings may impair the sealing ability of the packing rings.

As shown in FIG. 1, each packing ring 32 has a tapered upper surface 37 and a tapered lower surface 38. In its initial installed position, each tapered surface is inclined relative to a plane perpendicular to the axis 28 at a angle of from 5° to 20°. As explained subsequently, this angle will decrease as the packing rings are loaded. The planar upper and lower tapered surfaces 37 and 38 will thus have a frustoconical configuration, and are inclined at the same angle so that the packing rings may be stacked with the lower tapered surface 38 of one packing ring being in mating engagement with the upper tapered surface 37 of an adjoining packing ring. The generally conical configuration of the packing rings facilitates stacking the packing rings on the seat 22 and the bushing 24, and provides a fluid pressure enhanced seal between the rod R and the body 12. Each frustoconical surface 37, 38 has an inverted apex which is substantially aligned with the axis 28, with the inverted apex being below the respective tapered surface and opposite the gland member 42.

Referring again to FIGS. 1 and 2, it should be understood that by lowering the respective gland member 42, 64 relative to the body 12, 62, the lower end of the ring member 46, 66 engages the radially outward portion of the uppermost packing rings 32 to axially load the radially outward portion of each packing ring. The gland member thus exerts little if any axially compressive force on the radially interior portion of each packing ring. As is apparent from FIG. 1, this loading of the radially outer portion of each packing ring 32 wedges each packing ring between the interior surface 14 of the body 12 and the rod R, since the radially interior portion of each packing ring is prevented from moving axially downward by engagement of the radially inner portion of the lowermost packing ring with a bushing 24, and by engagement of the radially interior portion of each higher packing ring with an adjoining lower packing ring. The axial loading force on the radially outward portion of one packing ring is thus transmitted to the radially outward portion of the lower packing ring, so that each packing ring is loaded. This axial loading will move the radially outer portion of each packing ring downward to slowly fill the cavity 40 between the lowermost packing ring and the seat 22. As the packing rings are loaded, the radially inner portion of the uppermost packing ring may tend to extrude into the cavity between the gland member 42 and the rod R, but this extrusion is prevented by the bushing 48. The bushing 48 may move radially relative to the gland member 42 due to the enlarged configuration of the cavity 50 within the ring 46. In the FIG. 1 embodiment, limited radial movement of the gland ring 46 with respect to the-gland member 42 and the body 12 is also permitted due to a variance between the O.D. of the ring 46 and the I.D. of body 12.

Referring again to FIG. 3, a suitable packing ring 32 is depicted prior to being installed within a stuffing box body, and thus is not loaded. The rubber carrier 34 of the packing ring 32 has a radially outer cylindrical surface 73 extending between the ends of the radially outer upper and lower annular legs or supports 72 and 74. The inclined upper surface of the rubber carrier is provided with an annular recess or cavity having a generally U-shaped configuration with base 82 and sidewalls 83 and 84. The inclined lower surface of the rubber carrier has a similar annular recess or cavity with a base 86 and sidewalls 87 and 88. The radially inner portion of the rubber carrier has upper and lower legs or supports 78 and 80 which are similar to the legs 72 and 74. The upper and lower annular recesses in the rubber carrier form an axially central body portion 76 of the rubber carrier. The thermoplastic dynamic seal 36 is mounted on this central body portion 76 so that, during loading of each packing ring, a radial inwardly directed force is transmitted through the central body portion 76 of the rubber carrier to press on the thermoplastic dynamic seal 36 toward sealing engagement with the rod member R.

The thermoplastic dynamic seal 36 is provided within the groove formed in the radially inner surface of the rubber carrier 34, with the groove having a base 101 and the top and bottom sides 100 and 102. The inner surface of the thermoplastic dynamic sealing member 36 may have various configurations, although in a preferred embodiment the inner surface of the annular ring 36 includes a lower sealing surface 95 and an upper sealing surface 96 axially separated by an annular recess 94. The axial length of each sealing surface 95 and 96 is relatively short to minimize the contact area between the thermoplastic dynamic seal and the rod member, and to allow the radial inwardly directed forces transmitted through the rubber carrier 34 to be exerted on a relatively small area, thereby creating a relatively high unit loading force on each sealing surface 95 and 96. Each surface 95 and 96 is an axially short cylindrical surface with sidewalls parallel to the central axis 28. Extending downward from the surface 95 is a slightly inclined surface 97 which projects radially outward slightly in the downward direction. Similarly, an inclined surface 98 is provided above the sealing surface 96 and projects slightly radially outward in the upward direction. After wear of the thermoplastic dynamic sealing ring 36, the axial length of the sealing surfaces 95 and 96 may thus slightly lengthen since radial wearing of the surfaces 95 and 96 will slowly decrease the axial length of the inclined surfaces 97 and 98.

For the embodiment depicted in FIG. 3, the top surface of the dynamic seal 36 in planar engagement with top side 100 of the rubber carrier is perpendicular to the central axis 28, while the bottom surface of seal 36 in planar engagement with the bottom side 102 of the rubber carrier is tapered to project downward (away from the gland member) while moving radially inward. In an alternate embodiment, the top and bottom surfaces of the dynamic seal 36 and the mating top side and bottom side of the annular groove within the rubber carrier, may each be perpendicular to the axis 28. Also, the axial length of the upper tapered interior surface 98 is substantially less than the axial length of the lower tapered interior surface 97 for the dynamic seal 36 as shown in FIG. 3. In an alternate embodiment, the annular recess or groove 94 may be axially centered between the top and bottom surfaces of the dynamic seal, in which case the axial length of the upper tapered interior surface may be substantially equal to the axial length of the lower tapered interior surface.

In a preferred embodiment of the present invention, a radially inner surface of the rubber carrier is adapted for engagement with the rod R. The packing rings as shown in FIG. 3 are in their initial condition, and have only been lightly loaded. The entire inner surface of the rubber carrier extending downward from the thermoplastic dynamic seal 36 and extending upward from the thermoplastic dynamic seal 36 may be in engagement with the rod when the packing rings are fully loaded. Alternatively, the inner surface of at least part of the rubber carrier may be radially recessed, to that only a portion of the rubber carrier above or below the dynamic seal engages the rod member R. It is important to the present invention that the axial length of an inner surface of the rubber carrier 34 in engagement with the rod and between the base 86 of the groove and the thermoplastic seal and between the thermoplastic seal and the base 82 of the groove be relatively short, so that a small "footprint" of a rubber area is pressed into sealing engagement with the rod. It should thus be understood that the lower annular groove allows a relatively short axial length 90 of the inner surface of the rubber carrier to be pressed radially inward into sealing engagement with the rod, and that the portion 91 of the inner surface of the rubber carrier axially aligned with the lower annular groove cannot be effectively pressed into sealing engagement with the rod. Similarly, a relatively short upper portion 92 of the rubber carrier below the base 82 of the annular groove may be pressed into sealing engagement with the rod, while the portion 93 of the inner surface of the rubber carrier radially within the angled plane of the upper annular groove cannot be radially pressed into sealing engagement with the rod due to the presence of the upper annular groove.

Carrier 34 of each packing ring is preferably fabricated from a compressible material, such as rubber, which desirably provides the resilience to accommodate high side loading forces if the rod becomes misaligned with respect to the stuffing box. The inner surface 14 of the stuffing box body 12 may have a relatively rough finish. A rubber material for the carrier 34 is able to provide a reliable static seal over a large surface area with the exterior surface of the stuffing box body. Rubber carrier 34 has a high compressibility and a desired memory which allows the packing rings to be infrequently loaded. Between intermittent loadings, this high compressibility and memory enable the carrier to maintain high sealing integrity between the exterior surface 73 of the rubber carrier and the interior surface 14 of the body 12, and also exerts a substantial radially inward force on the thermoplastic dynamic seal 36, as explained above.

Rubber is also a preferred material for sealing with the rod member R to keep sand and other solid particles in the fluid from engaging the thermoplastic dynamic seal 36. The surface area of rubber pressed into sealing engagement with the rod is relatively low, however, in order to minimize the amount of generated heat due to movement of the rod on the inner surface of the carrier. Also, the inner surface of the rubber carrier in sealing engagement with the rod is lightly radially loaded relative to the radial loading on the thermoplastic dynamic seal. This loading may be easily adjusted by altering the depth of the annular grooves in the rubber carrier and/or the inner diameter of the surfaces 90 and 92 relative to the inner diameter of the sealing surfaces 95 and 96.

As shown in FIG. 3, the cross-section of the rubber carrier 34 has a substantially H-shaped configuration, with the radially outer annular supports or legs 72 and 74 being provided for axial loading of the stacked packing rings. Annular inner supports or legs 78 and 80 maintain the desired mating engagement of the inclined upper and inclined lower surfaces of the packing ring. The depth of the annular grooves in the upper and lower surfaces may be controlled to accommodate several purposes. First, the volume occupied by the upper and lower grooves in each packing ring is preferably sufficiently large to accommodate both thermal expansion and fluid swelling of the rubber carrier 34 when subjected to heated well fluids, thereby minimizing the likelihood of undesirably high loading forces being applied to the inner surfaces 90 and 92 of the rubber carrier due to restricted expansion forces. The annular grooves provided by the upper and lower surfaces of the rubber carrier are thus sized to accommodate both thermal expansion and expansion due to swelling which may occur when some rubber carrier materials are exposed to certain fluids. The volume of the upper and lower annular grooves is at least 5%, and preferably at least about 8% to about 10%, of the volume of the rubber carrier in order to accommodate this thermal expansion and swelling. The uppermost packing ring is also free to expand into the void above the packing ring, and the lowermost packing ring is similarly free to expand into the annular cavity 40. It is important, however, that the centrally stacked packing rings also be permitted to expand, thereby preventing high thermal "hot spots" in the stacked packing rings. Also, it is preferable that each stacked packing ring have the same configuration to minimize installation problems and inventory costs.

Secondly, the upper and lower grooves in the upper and lower surfaces of the rubber carrier are preferably concentric or axially aligned so that the rubber carrier may experience flexing about substantially the cross-sectional center of the rubber carrier. In other words, the upper and lower grooves allow the radially outer portion of the rubber carrier to move axially downward relative to the radially inner portion of the rubber carrier, thereby increasing sealing effectiveness. This flexing feature of the carrier as enhanced by the upper and lower annular grooves also ensures reliable mating engagement of the tapered end after the rings have been repeatedly loaded.

Thirdly, the annular grooves allow for effective controlling of the loading of the inner surfaces of the rubber carrier over a relatively small area of the carrier to seal with the rod. Preferably the seal depth of the annular grooves and the axial length of the radially inner surface of the thermoplastic dynamic seal 36 are controlled such that these combined lengths are at least 70% of the axial length of the outer surface 73 of the rubber carrier. Accordingly, the combined length of the surfaces 90 and 92 is less than 30% of the axial length of the outer surface 73 of the rubber carrier, and preferably the combined axial length of the surfaces 90 and 92 is less than 25% of the axial length of the outer surface 73 of the rubber carrier. By deepening the upper and lower grooves, the area of the rubber carrier which may be pressed radially inward into sealing engagement with the rod is thus minimized.

By forming the carrier 34 from rubber or another compressible material with a high memory, the gland member need only be intermittently tightened to maintain reliable sealing engagement. The axial compressive force on the radially outer surface of the rubber carriers thus results in a significant radially inward compressive force on the thermoplastic dynamic seals and a comparatively lighter inward compressive force on the relatively small sealing surfaces 90 and 92 of the rubber carrier.

The precise material for the compressible carrier will depend upon the application. Suitable compressible materials for the rubber carrier of the packing rings for most hydrocarbons applications will be a selected material from a group consisting of styrene-butadiene, nitrile-butadiene (including hydrogenated NBR), and hexafluoropropylene-vinylidene fluoride (FKM) copolymers.

The dynamic seal 36 is preferably formed from a plastic material which has a low coefficient of friction with the exterior surface of the moving rod member R. The reduced coefficient of friction and the relatively small sealing area of the dynamic seal 36 results in a minimal amount of generated heat, thereby contributing to the life of both the rubber carrier 34 and the dynamic seal 36. The material for the dynamic seal ring 36 is also preferably selected to withstand attack from chemicals which may be present in the downhole fluid, such as carbon dioxide and hydrogen sulfide. The material selected for the dynamic seal 36 may be better than rubber at withstanding crusted-type deposits which may accumulate on the rod, particularly when small amounts of steam escape past the packing rings. A preferred dynamic seal material according to the present invention may be thermoplastic material selected from a group consisting of tetrafluoroethylene (TFE), ultra-high molecular weight (UHMW) polyethylene, acetal, polyimide, polyamide, and a fiber re-enforced thermoplastic. A fabric reinforced rubber material, which has features similar to the above thermoplastic materials, may also be used for the dynamic seal. In the embodiments shown in the figures, a single annular dynamic seal is used with each carrier. In alternate embodiments, two or more axially spaced dynamic seals each within a respective groove or each within a common groove in the rubber carrier may be provided. Also, some applications will benefit from using a combination wiper and seal arrangement. An axially lower thermoplastic seal as disclosed herein may be provided on the rubber carrier axially below an annular wiper, which may be formed from a wire mesh and fabric composition. During reciprocation of the rod member R, the annular wiper acts to remove any deposits which otherwise may form on the surface of the polished rod, thereby keeping the polished rod clean for reliable sealing engagement with the thermoplastic dynamic seal.

In a preferred embodiment of the invention, the dynamic seal 36 is provided as a replaceable insert within the rubber carrier 34. A worn insert may be easily removed and replaced with a new insert. Alternatively, an insert may be removed and replaced with an insert of a different selected material. In other embodiments of the invention, the elastomeric dynamic seal may be glued or otherwise bonded to the rubber carrier.

Figure 4:
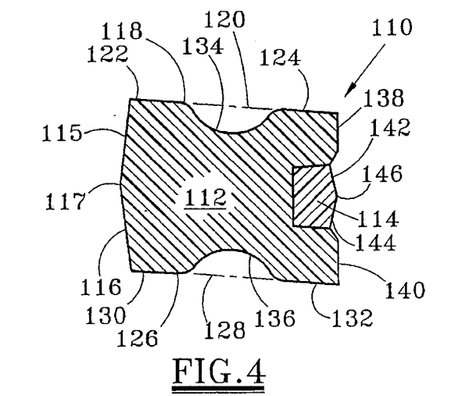
FIGS. 4, 5, and 6 are each cross-sectional views of alternate embodiments of a packing ring according to the present invention.
Figure 5:
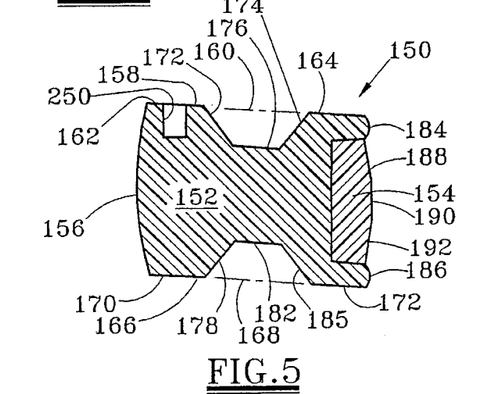
Figure 6:
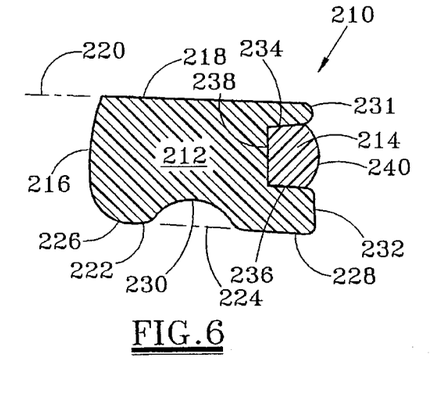

FIG. 4 illustrates an alternate embodiment of a packing ring 110 according to the present invention, including a rubber material carrier 112, and elastomeric dynamic seal ring 114. Each of the alternative packing rings shown in FIGS. 4–6 are depicted in their pre-installed or unloaded configuration. Packing ring 110 has radially outer tapered surfaces 115 and 116 which meet at an axially centered junction 117. The tapered surfaces 115 and 116 provide static sealing engagement with the inner surface 14 of the stuffing box body. When the packing ring 110 is installed within the body and a stuffing box, both surfaces 115 and 116 will provide static sealing engagement. The upper end of surface 115 and the lower end of surface 116 will likely sealingly engage the inner surface of the stuffing box body when the packing rings 1 10 are axially loaded, although high pressure sealing will be more effective along the axially central junction portion of the rubber carrier.

The tapered upper surface 118 of the rubber carrier 110 as shown in FIG. 4 includes a radially outer top planar surface 122 and a radially inner top planar surface 124, each lying along a tapered plane 120. Similarly, the lower tapered surface 126 includes a radially outer portion 130 and a radially inner portion 132 each lying along the tapered lower plane 128. An upper annular groove 134 and a lower annular groove 136 are provided in the upper and lower surfaces, with each groove having a generally curved bottom as shown. Thermoplastic dynamic seal 114 includes substantially a line contact seal area 146 between tapered surfaces 142 and 144. The axial length of the surface 146 will increase during wear, although preferably the axial length of the sealing surface 146 will be relatively short to minimize generated heat. The radially inner surface of the rubber carrier 112 includes an upper surface 138 and a lower surface 140 each for sealing engagement with the rod. Again, only a small portion of the surfaces 138 and 140 will be radially pressed into sealing engagement with the rod due to the depth of the grooves 134 and 136.

FIG. 5 depicts another embodiment of packing ring 150 comprising a rubber carrier 152 and a thermoplastic dynamic seal 154. The outer surface 156 of the rubber carrier has a slightly curved configuration, thereby increasing the sealing effectiveness of the rubber carrier with the inner surface 14 of the stuffing box body 12 in the area adjacent the axially central portion of the rubber carrier. The tapered tipper surface 158 of the rubber carrier includes an outer portion 162 and an inner -portion 164 each formed along tapered upper plane 160. The lower tapered surface 166 similarly includes a radially outer portion 170 and a radially inner portion 172 each formed along the inclined lower plane 168. The groove in the upper surface 158 of the rubber carrier has a base surface 176 and tapered sidewalls 172 and 174. Similarly, the lower groove has a base surface 182 and tapered sidewalls 178 and 185.

In the FIG. 5 embodiment, the axial length of the thermoplastic dynamic seal has been increased to be slightly greater than the axial spacing between the groove surfaces 176 and 182. Accordingly, no portion of the rubber carrier can be pressed radially inward when the outward portion of the rubber carrier is axially loaded. Nevertheless, the rubber carrier may be constructed so that annular lower sealing surface 186 and an annular upper sealing surface 184 of the rubber carrier still sealingly engage the rod member. The axial length of the sealing surface 190 is also increased, and tapered upper and lower inner surfaces 188 and 192 are provided above and below the sealing surface 190. The embodiment as shown in FIG. 5 is particularly well suited for use in an application wherein the stuffing box is not likely to encounter a large amount of solid abrasives.

Each of the designs as shown in FIGS. 3, 4 and 5 utilizes a rubber carrier with an upper and a lower annular groove, so that the rubber carrier has a generally H-shaped configuration. The robber carrier 212 for the packing ring 210 as shown in FIG. 6 has a single annular groove in its lower surface. Carrier 212 thus includes a radially exterior surface 216, which is similar to the embodiment as shown in FIG. 5 in that the surface is slightly rounded to increase sealing effectiveness in the area adjacent the axial center of the rubber carrier. The rubber carrier includes a tapered upper surface 218 formed along plane 220, and a tapered lower surface 222 having a radially outer portion 226 and a radially inner portion 228 each formed along the lower inclined plane 224. The annular groove 230 in the lower surface has a curved configuration, although the rubber carrier 212 could be provided with an annular groove as shown in the FIG. 3 or FIG. 5 embodiments. The annular groove could also be provided in only the upper surface, so that the lower surface of each carrier with no groove engaged the grooved upper surface of a lower packing ring.

Thermoplastic dynamic seal 214 as shown on the FIG. 6 embodiment is fitted within a groove provided in the rubber carrier formed by base 238 and upper and lower surfaces 234 and 236. The thermoplastic dynamic seal 214 includes a curved radially interior surface 240 for sealing engagement with the rod, although a cylindrical surface with an increasingly long axial length will be formed as the curved surface 240 wears. Thermoplastic dynamic seal 214 is substantially centered between the base of the groove 230 and the surface 218. Accordingly, a relatively thin rubber portion is provided above the seal 214 with an interior surface 231 for engagement with the rod. Only a portion of the lower radially lower inner surface 232 of the rubber carrier will be pressed axially inward when the rubber carrier is loaded due to the groove 230 being provided in the lower surface of the rubber carrier.

For each of the embodiments shown in FIGS. 3–6, the packing ring in cross-section includes an axially extending radially outer leg and an axially extending radially inner leg, with at least one groove spaced radially between these legs. Each leg has a solid thickness sufficient to reliably transmit forces to an adjacent lower packing ring, and the thickness of each leg prevents the leg from buckling or moving radially from its intended position. The adjoining lower leg of one packing ring and the upper leg of a lower packing ring thus stay radially aligned. When the packing rings are axially loaded, substantial voids do not exist between stacked packing rings except for the annular voids in the upper and/or lower tapered surfaces of the packing rings, as described herein. When axially loaded, the axial length of the radially outer surface of each rubber carrier engages the inner surface of the stuffing box body, and the radially inner surface of the rubber carrier axially above and below the thermoplastic seal engages the rod member. As previously explained, however, the entirety of these rubber carrier surfaces need not sealingly engage the stuffing box body or the rod member, and a substantial portion of the radially inner surface of each rubber carrier is not in forced sealing engagement with the rod member due to the annular grooves, thereby desirably minimizing frictionally generated heat by dynamic engagement with the rod member.

FIG. 5 depicts a cylindrical-shaped pocket 250 in the carrier 152. In order to assist in removal of each packing ring, a plurality of circumferentially opposed threaded pockets 250 may be provided in the radially outer portion of each of the rubber carriers as described herein. A bolt or other conventional tool having a lower threaded end may then be threaded into each of two circumferentially opposed pockets 250. An upward force may be simultaneously applied to both of the bolts to raise the radially outer portion of each rubber carrier and thereby assist in removing each packing ring from its wedged position within the body 12. A removal tool is not shown in FIG. 5 since it may have any desired configuration which will allow the operator to grasp the tool once it is threaded within the pocket so that an upward force may be applied to an diametrically opposed sides of each packing ring. In an alternative embodiment, a tool with non-spiraling gripping teeth may be inserted into each pocket to facilitate removal of a packing ring.

Those skilled in the art should appreciate the various features of both the rubber carriers and the thermoplastic dynamic inserts as shown in different embodiments discussed above may be employed. For example, an insert as shown in FIG. 3 and a carrier having annular upper and lower grooves as shown in FIG. 5 may be employed with radially outer surfaces and radially interior surfaces on the rubber carrier as shown in FIG. 4. The rubber carrier as shown in any of the FIGS. 3–6 may thus be modified to include any configuration of annular groove(s), and, if required, may be modified to receive any of the dynamic seals disclosed herein.

When it is desired to service or replace the packing rings, gland member 42, 64 may be removed from the body 12, 62 and the packing rings then removed through the exposed upper end of the body 12, optionally using removal tools threaded in the pockets 250 if the packing rings are wedged tightly within the body. The packing rings may then be replaced with new rubber carriers or rubber carriers of a different selected material. Alternatively, the worn thermoplastic dynamic sealing rings 36 may be replaced with new seals or may be replaced with thermoplastic dynamic seals of a different material. Once the packing rings are stacked within the body 12 as shown in FIG. 1, gland member 42, 64 may be returned to its position on the body, and a downward force exerted on the uppermost packing ring 32, thereby loading a radially outer portion of each of the packing rings to obtain a reliable static seal between the outer surface of each packing ring and the interior surface 14 of the body 12, and simultaneously creating a wedging action which exerts a radially inward directed force through the rubber carrier to the thermoplastic dynamic seals 46.

After a period of use, it may be necessary to tighten the gland member to obtain more reliable sealing engagement of the packing rings with the rod member. As the gland member is tightened, it should be understood that the angle of the inclined upper and lower mating planes of the stacked gland members will decrease, so that the same axial loading force will result in an increased radial force being applied to the thermoplastic dynamic seals due to reduced wedging angle.

A bushing as shown in FIGS. 1 and 2, a metal ring at least partially fitted within the upper annular cavity of the uppermost packing ring, or other members may be used for preventing extrusion of the packing rings. The stuffing box body and the gland member may have various configurations. Although the packing rings are preferably "inverted" so that the apex of the tapered upper and lower surfaces is opposite the gland member with respect to the corresponding tapered surface, the tapered upper and lower packing ring surfaces could project radially inward and toward the gland member. In this case, the interior portion of the packing rings is preferably loaded by the gland member, and the radially outward portion of the lowermost packing ring is supported on the seat. The inverted design as more fully described above is preferred, since desirably the outward portion of the packing rings is then loaded and the inner portion of the lowermost packing ring is supported on the seat. Also, the inverted design utilizes high fluid pressure to form a more effective dynamic seal with the rod member R.

Another alternative embodiment of a stuffing box may include a "doublepacked" stuffing box with a plurality of upper packing rings and a plurality of lower packing rings, as generally described in U.S. Pat. No. 2,833,572. It is sometimes desirable to provide two separate and distinct sets of packing rings for application wherein higher pressures and intermittent flow are anticipated, thereby allowing one set of the packing rings to maintain a seal temporarily while the other set of packing rings is replaced. The stuffing box may also be designed for sealing engagement with a rotating rod string, in which case the stuffing box body may be configured to support the axial load on the rotating rod string, as disclosed in U.S. Pat. No. 4,480,842.

Those skilled in the art will appreciate that a stuffing box and packing rings for a stuffing box may be used for applications other than hydrocarbon recovery. The improved stuffing box and packing rings may be used to seal with a rotating valve stem, a rising valve stem, or a combination rotating and rising valve stem, and these valve stems may be used for operating various types of valves. The stuffing box and packing ring may also be used to seal with rods or pistons of pumps and other pressure generating or pressure handling equipment. It should therefore be apparent that the present invention is well adapted to obtain the objects discussed herein. It should also be understood that certain combinations and sub-combinations are of utility and may be employed without reference to other features and sub-combinations. In particular, the improved packing seals of the present invention may be used on existing stuffing boxes.

The foregoing disclosure and description of the invention is illustrative and explanatory. It will be appreciated by those skilled in the art that various changes in the size, shape and materials, as well as in the details of the illustrated construction or combinations of features and the methods discussed herein may be made without departing from the spirit of the invention.

What is claimed is:

1. A stuffing box for sealing engagement with a rod member movable with respect to and passing through the stuffing box to seal fluid within the stuffing box, the stuffing box comprising:

a stuffing box body having a cylindrical interior surface defining a central stuffing box axis;

a plurality of axially spaced packing rings, each of the packing rings comprising an annular compressible carrier formed from a first selected material and an annular plastic dynamic seal supported within an annular interior cavity extending radially inward to a radially inward surface of the compressible carrier, each compressible carrier including a tapered upper surface, a tapered lower surface, and a radially outer surface for sealing engagement with the cylindrical interior surface of the stuffing box body, and each annular plastic dynamic seal including a radially interior surface for sealing engagement with the rod member; and a gland member axially movable relative to the stuffing box body for adjustably varying an axially compressive force on the plurality of packing rings, the gland member having a packing ring engaging surface for exerting the axially compressive force on the plurality of packing rings and thereby generating a radial inwardly directed biasing force on each plastic dynamic seal through the respective compressible carrier for sealing engagement of the plastic dynamic seal with the rod member.

2. The stuffing box as defined in claim 1, wherein:

the tapered upper surface on the compressible carrier is a frustoconical surface having an apex axially opposite the gland member with respect to the tapered upper surface;

the tapered lower surface on the compressible carrier is a frustoconical surface having an apex axially opposite the gland member with respect to the tapered lower surface; and the gland member exerts the axially compressive force on a radially outward portion of the plurality of packing rings.

3. The stuffing box as defined in claim 1, wherein:

the compressible carrier includes a radially inward lower annular surface axially opposite the gland member with respect to the plastic dynamic seal for sealing engagement with the rod member.

4. The stuffing box as defined in claim 3, further comprising:

the compressible carrier includes an annular lower recess in the tapered lower surface and spaced radially between the radially outer surface of the compressible carrier and the plastic dynamic seal to minimize radial loading of the radially inward lower annular surface of the compressible carrier on the rod member relative to loading on the plastic dynamic seal.

5. The stuffing box as defined in claim 1, wherein:

the compressible carrier includes a radially inward upper annular surface axially between the gland member and the plastic dynamic seal for sealing engagement with the rod member.

6. The stuffing box as defined in claim 5, further comprising:

the compressible carrier includes an annular upper recess in the tapered upper surface and spaced radially between the radially outer surface of the compressible carrier and the plastic dynamic seal to minimize radial loading of the radially inward upper annular surface of the compressible carrier on the rod member relative to loading on the plastic dynamic seal.

7. The stuffing box as defined in claim 1, further comprising:

the compressible carrier includes an annular lower recess in the tapered lower surface and an annular upper recess in the tapered upper surface, each annular recess spaced radially between the radially outer surface of the compressible carrier and the plastic dynamic seal, the lower and the upper annular recesses being axially aligned to facilitate bending of the compressible carrier.

8. The stuffing box as defined in claim 1, further comprising:

an annular recess in at least one of the tapered upper surface and the tapered lower surface of the compressible carrier, the annular recess having a volume of at least five percent of the volume of the compressible carrier to accommodate thermal expansion of the compressible carrier.

9. The stuffing box as defined in claim 1, wherein:

the tapered upper surface and the tapered lower surface are each inclined at an angle of less than 20° with respect to a plane perpendicular to the central stuffing box axis.

10. The stuffing box as defined in claim 1, further comprising:

an annular recess in at least one of the tapered upper surface and tapered lower surface of the compressible carrier; and an axial depth of the at least one annular recesses and an axial length of the radial interior surface of the plastic dynamic seal being at least seventy percent of an axial length of the radially outer surface of the compressible carrier.

11. The stuffing box as defined in claim 1, further comprising:

the stuffing box body including a packing ring support surface axially opposite the gland member with respect to the plurality of packing rings; and a bushing supported on and movable with respect to the packing ring support surface for engagement with the radially interior portion of a lowermost one of the plurality of packing rings for opposing the axially compressive force applied by the gland member.

12. The stuffing box as defined in claim 1, further comprising:

the stuffing box including a packing ring support surface axially opposite the gland member with respect to the plurality of packing rings; and an annular void between the packing ring support surface and the tapered lower surface of a lowermost one of the plurality of packing rings adjacent the packing ring support surface, the annular void receiving the lowermost one of the plurality of packing rings when the gland member is moved axially toward the packing ring support surface.

13. The stuffing box as defined in claim 1, further comprising:

an extrusion bushing radially moveable relative to the gland member for preventing extrusion of one of the plurality of packing rings between the gland member and the rod member.

14. The stuffing box as defined in claim 1, further comprising:

a plurality of circumferentially spaced holes passing through the tapered upper surface of a compressible carrier and terminating above the tapered lower surface of the compressible carrier for facilitating removal of the packing ring from the stuffing box body.

15. The stuffing box as defined in claim 1, wherein the compressible carrier is formed from a group consisting of styrene-butadiene, nitrile-butadiene and hexafluoropropylene-vinylidene fluoride copolymers.

16. The stuffing box as defined in claim 1, wherein the plastic dynamic seal is formed from a group consisting of tetrafluoroethylene, ultra-high molecular weight polyethylene, acetal, polyimide, polyamide, and a fiber re-enforced thermoplastic.

17. An oilfield stuffing box for sealing engagement with a polished rod of a rod string moveable with respect to and passing through the stuffing box to power a downhole pump, the stuffing box sealing oilfield fluids within the stuffing box, the stuffing box comprising:

a stuffing box body having a cylindrical interior surface defining a central stuffing box axis;

a plurality of axially spaced packing rings, each of the packing rings comprising an annular rubber carrier and an annular plastic dynamic seal supported on the rubber carrier, each rubber carrier including a frustoconical upper surface having an apex below the upper surface, a frustoconical lower surface having an apex below the lower surface, and a radially outer surface for sealing engagement with the cylindrical interior surface of the stuffing box body, and each annular plastic dynamic seal including a radially interior surface for sealing engagement with the rod member;

a gland member positioned above and axially moveable relative to the stuffing box body for adjustably varying an axially compressive force on the plurality of packing rings, the gland member having a packing ring engaging surface for exerting the axially compressive force on a radially outward portion of the plurality of packing rings and thereby generating a radial inwardly directed biasing force on each plastic dynamic seal through the respective rubber carrier for sealing engagement of the plastic dynamic seal with the rod member;

the stuffing box including a packing ring support surface axially opposite the gland member with respect to the plurality of packing rings;

an annular void between the packing ring support surface and the tapered lower surface of a lowermost one of the plurality of packing rings adjacent the packing ring support surface, the annular void receiving the lowermost one of the plurality of packing rings when the gland member is moved axially toward the packing ring support surface; and an annular recess in at least one of the frustoconical upper surface and the frustoconical lower surface of the rubber carrier, the annular recess having a volume of at least five percent of the volume of the rubber carrier to accommodate thermal expansion of the rubber carrier.

18. The stuffing box as defined in claim 17, further comprising:

the rubber carrier includes a radially inward lower annular surface axially opposite the gland member with respect to the plastic dynamic seal for sealing engagement with the rod member; and the annular recess includes an annular lower recess in the frustoconical lower surface and spaced radially between the radially outer surface of the rubber carrier and the plastic dynamic seal to minimize radial loading of the radially inward lower annular surface of the rubber carrier on the rod member relative to loading on the plastic dynamic seal.

19. The stuffing box as defined in claim 17, further comprising:

the rubber carrier includes a radially inward upper annular surface axially between the gland member and the plastic dynamic seal for sealing engagement with the rod member; and the annular recess includes an annular upper recess in the frustoconical upper surface and spaced radially between the radially outer surface of the rubber carrier and the plastic dynamic seal to minimize radial loading of the radially inward upper annular surface of the rubber carrier on the rod member relative to loading on the plastic dynamic seal.

20. The stuffing box as defined in claim 17, further comprising:

the annular recess includes an annular lower recess in the frustoconical lower surface and an annular upper recess in the frustoconical upper surface, each annular recess spaced radially between the radially outer surface of the rubber carrier and the plastic dynamic seal, the lower and the upper annular recesses being axially aligned to facilitate bending of the rubber carrier.

21. The stuffing box as defined in claim 17, wherein:

the frustoconical upper surface and the frustoconical lower surface are each inclined at an angle of less than 20° with respect to a plane perpendicular to the central stuffing box axis.

22. The stuffing box as defined in claim 17, further comprising:

an axial depth of the annular recesses and an axial length of the radial interior surface of the plastic dynamic seal being at least seventy percent of an axial length of the radially outer surface of the rubber carrier.

23. The stuffing box as defined in claim 17, further comprising:

a plurality of circumferentially spaced holes passing through an upper surface of each packing ring for facilitating removal of the packing ring from the stuffing box body.

24. The stuffing box as defined in claim 17, wherein the rubber carrier is formed from a group consisting of styrene-butadiene, nitrile-butadiene and hexafluoropropylene-vinylidene fluoride copolymers.

25. A plurality of axially spaced packing rings for positioning within an interior of a stuffing box body for sealing engagement between the stuffing box body and a rod member movable with respect to and passing through the stuffing box body, each of the plurality of packing rings comprising:

an annular compressible carrier including a frustoconical upper surface, a frustoconical lower surface for mating planar engagement with a frustoconical upper surface of an adjoining packing ring, and a radially outer surface for sealing engagement with the stuffing box body;

an annular plastic dynamic seal supported within an annular interior cavity extending radially inward to an inward surface of the compressible carrier and including a radially interior surface for sealing engagement with the rod member; and each compressible carrier being configured to transmit an axially compressive force on each compressible carrier and thereby generate a radially inward directed biasing force on each plastic dynamic seal through the compressible carrier for sealing engagement of the plastic dynamic seal with the rod member.

26. The plurality of packing rings as defined in claim 25, further comprising:

each compressible carrier includes an annular lower recess in the frustoconical lower surface and an annular upper recess in the frustoconical upper surface, each annular recess spaced radially between the radially outer surface of the compressible carrier and the plastic dynamic seal, the lower and the upper annular recesses being axially aligned to facilitate bending of the compressible carrier.

27. The plurality of packing rings as defined in claim 25, further comprising:

an annular recess in at least one of the frustoconical upper surface and the frustoconical lower surface of the compressible carrier, the annular recess having a volume of at least five percent of the volume of the compressible carrier to accommodate thermal expansion of the compressible carrier.

28. The plurality of packing rings as defined in claim 25, further comprising:

an annular recess in at least one of the frustoconical upper surface and frustoconical lower surface of the compressible carrier; and an axial depth of the at least one annular recesses and an axial length of the radial interior surface of the plastic dynamic seal being at least seventy percent of an axial length of the radially outer surface of the compressible carrier.

29. The plurality of packing rings as defined in claim 25, wherein:

each compressible carrier includes a radially inward lower annular surface for sealing engagement with the rod member; and each compressible carrier including an annular lower recess in the tapered lower surface and spaced radially between the radially outer surface of the compressible carrier and the plastic dynamic seal to minimize radial loading of the radially inward lower annular surface of the compressible carrier on the rod member relative to loading on the plastic dynamic seal.

30. The plurality of packing rings as defined in claim 25, wherein:

each compressible carrier includes a radially inward upper annular surface for sealing engagement with the rod member; and each compressible carrier including an annular upper recess in the tapered upper surface and spaced radially between the radially outer surface of the compressible carrier and the plastic dynamic seal to minimize radial loading of the radially inward upper annular surface of the compressible carrier on the rod member relative to loading on the plastic dynamic seal.

31. The plurality of packing rings as defined in claim 25, further comprising:

a plurality of circumferentially spaced holes passing through the tapered upper surface of a compressible carrier and terminating above the tapered lower surface of the compressible carrier for facilitating removal of the packing ring from the stuffing box body.

32. The plurality of packing rings as defined in claim 25, wherein each compressible carrier is formed from a group consisting of styrene-butadiene, nitrile-butadiene and hexafluoropropylene-vinylidene fluoride copolymers.

33. The plurality of packing rings as defined in claim 25, wherein each plastic dynamic seal is formed from a group consisting of tetrafluoroethylene, ultrahigh molecular weight polyethylene, acetal, polyimide, polyamide, and a fiber reenforced thermoplastic.

34. A method of sealing between a stuffing box body having a cylindrical interior surface defining a central stuffing box axis and a rod member movable with respect to and passing through the stuffing box body, the method comprising:

positioning a plurality of axially spaced packing rings within the stuffing box body, each of the packing rings comprising an annular compressible carrier and an annular plastic dynamic seal supported within an annular interior cavity extending radially inward to a radially inward surface the compressible carrier, each compressible carrier including a tapered upper surface, a tapered lower surface for mating engagement with the tapered upper surface of an adjoining packing ring, and a radially outer surface for sealing engagement with the cylindrical interior surface of the stuffing box body, and each annular plastic dynamic seal including a radially interior surface for sealing engagement with the rod member; and selectively moving a gland member axially relative to the stuffing box body for adjustably varying an axially compressive force on the plurality of packing rings and thereby wedging each packing ring between the stuffing box body and the rod member to generate a radially inward directed biasing force on each plastic dynamic seal through the respective rubber carrier for sealing engagement of the plastic dynamic seal with the rod member.

35. The method as defined in claim 34, further comprising:

providing a radially inward lower annular surface on the compressible carrier axially opposite the gland member with respect to the plastic dynamic seal for sealing engagement with the rod member; and providing an annular lower recess in the tapered lower surface of the compressible carrier and spaced radially between the radially outer surface of the compressible carrier and the plastic dynamic seal to minimize radial loading of the radially inward lower annular surface of the compressible carrier on the rod member relative to loading on the plastic dynamic seal.

36. The method as defined in claim 34, further comprising:

providing a radially inward upper annular surface on the compressible carrier axially between the gland member and the plastic dynamic seal for sealing engagement with the rod member; and providing an annular upper recess in the tapered upper surface of the compressible carrier and spaced radially between the radially outer surface of the compressible carrier and the plastic dynamic seal to minimize radial loading of the radially inward upper annular surface of the compressible carrier on the rod member relative to loading on the plastic dynamic seal.

37. The method as defined in claim 34, further comprising:

providing an annular lower recess in the tapered lower surface and an annular upper recess in the tapered upper surface of the compressible carrier, each annular recess spaced radially between the radially outer surface of the compressible carrier and the plastic dynamic seal to facilitate bending of the compressible carrier.

38. The method as defined in claim 34, further comprising:

providing an annular recess in at least one of the tapered upper surface and the tapered lower surface of the compressible carrier, the annular recess having a volume of at least five percent of the volume of the compressible carrier to accommodate thermal expansion of the compressible carrier.

39. The method as defined in claim 34, further comprising:

inclining the tapered upper surface and the tapered lower surface at an angle of less than 20° with respect to a plane perpendicular to the central stuffing box axis.

40. The method as defined in claim 34, wherein selectively moving the gland member varies the axially compressive force on a radially outward portion of the plurality of packing rings.

41. The method as defined in claim 34, further comprising:

providing an annular recess in at least one of the tapered upper surface and tapered lower surface of the compressible carrier; and controlling an axial depth of the at least one annular recesses and an axial length of the radial interior surface of the plastic dynamic seal to be at least seventy percent of an axial length of the radially outer surface of the compressible carrier.

42. The method as defined in claim 34, further comprising:

providing a plurality of circumferentially spaced holes passing through an upper surface of each compressible member and terminating above the tapered lower surface of each compressible member; and inserting a tool having a threaded lower end in each hole to facilitate removal of the packing ring from the stuffing box body.

43. A stuffing box for sealing engagement with a rod member moveable with respect to and passing through the stuffing box to seal fluid within the stuffing box, the stuffing box comprising:

a stuffing box body having a cylindrical interior surface defining a central stuffing box axis;

one or more packing rings, each of the one or more packing rings comprising an annular compressible carrier and an annular plastic dynamic seal supported on the compressible carrier, each of the one or more compressible carriers including a tapered upper surface, a tapered lower surface, and a radially outer surface for sealing engagement with the cylindrical interior surface of the stuffing box body, and each of the one or more annular plastic dynamic seals including a radially interior surface for sealing engagement with the rod member;

an annular recess in at least one of the tapered upper surface and the tapered lower surface of the one or more compressible carriers, the annular recess having a volume of at least five percent of the volume of the compressible carrier to accommodate thermal expansion of the compressible carrier; and a gland member axially moveable relative to the stuffing box body for adjustably varying an axially compressive force on the one or more packing rings, the gland member having a packing ring engaging surface for exerting the axially compressive force on the one or more packing rings and thereby generating a radial inwardly directed biasing force on each plastic dynamic seal through the respective compressible carrier for sealing engagement of the plastic dynamic seal with the rod member.

44. The stuffing box as defined in claim 43, wherein:

the tapered upper surface on the compressible carrier is a frustoconical surface having an apex axially opposite the gland member with respect to the tapered upper surface;

the tapered lower surface on the compressible carrier is a frustoconical surface having an apex axially opposite the gland member with respect to the tapered lower surface; and the gland member exerts the axially compressive force on a radially outward portion of the plurality of packing rings.

45. The stuffing box as defined in claim 43, further comprising:

the compressible carrier includes a radially inward lower annular surface axially opposite the gland member with respect to the plastic dynamic seal for sealing engagement with the rod member; and the annular recess is a lower recess in the tapered lower surface and spaced radially between the radially outer surface of the compressible carrier and the plastic dynamic seal to minimize radial loading of the radially inward lower annular surface of the compressible carrier on the rod member relative to loading on the plastic dynamic seal.

46. The stuffing box as defined in claim 43, further comprising:

the compressible carrier includes a radially inward upper annular surface axially between the gland member and the plastic dynamic seal for sealing engagement with the rod member; and the annular recess is an upper recess in the tapered upper surface and spaced radially between the radially outer surface of the compressible carrier and the plastic dynamic seal to minimize radial loading of the radially inward upper annular surface of the compressible carrier on the rod member relative to loading on the plastic dynamic seal.

47. The stuffing box as defined in claim 43, further comprising:

the annular recess includes an annular lower recess in the tapered lower surface and an annular upper recess in the tapered upper surface, each annular recess spaced radially between the radially outer surface of the compressible carrier and the plastic dynamic seal, the lower and the upper annular recesses being axially aligned to facilitate bending of the compressible carrier.

48. The stuffing box as defined in claim 43, wherein:

the tapered upper surface and the tapered lower surface are each inclined at an angle of less than 20° with respect to a plane perpendicular to the central stuffing box axis.

49. The stuffing box as defined in claim 43, wherein an axial depth of the at least one annular recesses and an axial length of the radial interior surface of the plastic dynamic seal being at least seventy percent of an axial length of the radially outer surface of the compressible carrier.

50. The stuffing box as defined in claim 43, further comprising:

the stuffing box body including a packing ring support surface axially opposite the gland member with respect to the plurality of packing rings; and a bushing supported on and movable with respect to the packing ring support surface for engagement with the radially interior portion of a lowermost one of the plurality of packing rings for opposing the axially compressive force applied by the gland member.

51. The stuffing box as defined in claim 43, further comprising:

an extrusion bushing radially movable relative to the gland member for preventing extrusion of one of the plurality of packing rings between the gland member and the rod member.

52. The stuffing box as defined in claim 1, further comprising:

a plurality of circumferentially spaced holes passing through the tapered upper surface of the compressible carrier and terminating above the tapered lower surface of the compressible carrier for facilitating removal of the packing ring from the stuffing box body.

53. The stuffing box as defined in claim 43, wherein the compressible carrier is formed from a group consisting of styrene-butadiene, nitrile-butadiene and hexafluoropropylene-vinylidene fluoride copolymers.

54. The stuffing box as defined in claim 43, wherein the plastic dynamic seal is formed from a group consisting of tetrafluoroethylene, ultra-high molecular weight polyethylene, acetal, polyimide, polyamide, and a fiber re-enforced thermoplastic.

55. A packing ring for positioning within an interior of a stuffing box body for sealing engagement between the stuffing box body and a rod member movable with respect to and passing through the stuffing box body, the packing ring comprising:

an annular compressible carrier including a frustoconical upper surface, a frustoconical lower surface, and a radially outer surface for sealing engagement with the stuffing box body;

an annular recess in at least one of the frustoconical upper surface and the frustoconical lower surface of the compressible carrier, the annular recess having a volume of at least five percent of the volume of the compressible carrier to accommodate thermal expansion of the compressible carrier;

an annular plastic dynamic seal supported on the compressible carrier and including a radially interior surface for sealing engagement with the rod member; and the compressible carrier being configured to transmit an axially compressive force on the compressible carrier and thereby generate a radially inward directed biasing force on each plastic dynamic seal through the compressible carrier for sealing engagement of the plastic dynamic seal with the rod member.

56. The plurality of packing rings as defined in claim 55, further comprising:

the annular recess is a lower recess in the frustoconical lower surface and an annular upper recess in the frustoconical upper surface, each annular recess spaced radially between the radially outer surface of the compressible carrier and the plastic dynamic seal, the lower and the upper annular recesses being axially aligned to facilitate bending of the compressible carrier.

57. The plurality of packing rings as defined in claim 55, further comprising:

an axial depth of the at least one annular recesses and an axial length of the radial interior surface of the plastic dynamic seal being at least seventy percent of an axial length of the radially outer surface of the compressible carrier.

58. The plurality of packing rings as defined in claim 55, wherein:

the compressible carrier includes a radially inward lower annular surface for sealing engagement with the rod member; and the annular recess is a lower recess in the tapered lower surface and spaced radially between the radially outer surface of the compressible carrier and the plastic dynamic seal to minimize radial loading of the radially inward lower annular surface of the compressible carrier on the rod member relative to loading on the plastic dynamic seal.

59. The plurality of packing rings as defined in claim 55, wherein:

the compressible carrier includes a radially inward upper annular surface for sealing engagement with the rod member; and the annular recess is upper recess in the tapered upper surface and spaced radially between the radially outer surface of the compressible carrier and the plastic dynamic seal to minimize radial loading of the radially inward upper annular surface of the compressible carrier on the rod member relative to loading on the plastic dynamic seal.

60. The plurality of packing rings as defined in claim 55, further comprising:

a plurality of circumferentially spaced holes passing through the tapered upper surface of the compressible carrier and terminating above the tapered lower surface of the compressible carrier for facilitating removal of the packing ring from the stuffing box body.

61. The plurality of packing rings as defined in claim 55, wherein each compressible carrier is formed from a group consisting of styrene-butadiene, nitrile-butadiene and hexafluoropropylene-vinylidene fluoride copolymers.

62. The plurality of packing rings as defined in claim 55, wherein each plastic dynamic seal is formed from a group consisting of tetrafluoroethylene, ultra-high molecular weight polyethylene, acetal, polyimide, polyamide, and a fiber re-enforced thermoplastic.

* * * * *